US008839210B2

(12) United States Patent
Kamigata et al.

(10) Patent No.: US 8,839,210 B2
(45) Date of Patent: Sep. 16, 2014

(54) PROGRAM PERFORMANCE ANALYSIS APPARATUS

(75) Inventors: Teruhiko Kamigata, Kawasaki (JP); Atsuhiro Suga, Kawasaki (JP); Shigeru Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 940 days.

(21) Appl. No.: 12/382,753

(22) Filed: Mar. 23, 2009

(65) Prior Publication Data

US 2009/0217247 A1    Aug. 27, 2009

Related U.S. Application Data

(63) Continuation of application No. PCT/JP2006/319367, filed on Sep. 28, 2006.

(51) Int. Cl.
*G06F 9/44* (2006.01)
*G06F 11/00* (2006.01)
*G06F 9/45* (2006.01)

(52) U.S. Cl.
USPC ............ 717/131; 717/127; 717/152; 714/47.1

(58) Field of Classification Search
CPC ......................... G06F 11/3065–11/3086; G06F 11/3089–11/3096; G06F 11/3409–11/3433; G06F 11/3452; G06F 11/3466–11/3495; G06F 8/4434–8/4443
See application file for complete search history.

(56) References Cited

U.S. PATENT DOCUMENTS

| 4,080,650 | A | * | 3/1978 | Beckett ......................... 717/129 |
| 4,217,636 | A | * | 8/1980 | Olmstead ...................... 702/186 |
| 5,396,631 | A | * | 3/1995 | Hayashi et al. ................ 717/159 |
| 5,442,740 | A | * | 8/1995 | Parikh ............................ 345/440 |
| 5,530,942 | A | * | 6/1996 | Tzou et al. ..................... 715/202 |
| 5,889,530 | A | * | 3/1999 | Findlay .......................... 345/440 |
| 5,953,534 | A | * | 9/1999 | Romer et al. .................. 717/138 |
| 5,958,009 | A | * | 9/1999 | Friedrich et al. .............. 709/224 |
| 6,086,622 | A | * | 7/2000 | Abe et al. ......................... 703/26 |
| 6,272,666 | B1 | * | 8/2001 | Borkar et al. .................. 716/113 |
| 6,321,263 | B1 | * | 11/2001 | Luzzi et al. .................... 709/224 |
| 6,463,553 | B1 | * | 10/2002 | Edwards ..................... 714/38.13 |
| 6,732,307 | B1 | * | 5/2004 | Edwards ........................ 714/724 |
| 6,757,639 | B2 | | 6/2004 | Kataoka |

(Continued)

FOREIGN PATENT DOCUMENTS

| JP | 06-119205 A | 4/1994 |
| JP | 6-119205 A | 4/1994 |

(Continued)

OTHER PUBLICATIONS

Japanese Office Action dated Nov. 8, 2011 issued in application No. 2008-536267.

*Primary Examiner* — Tuan Q. Dam
*Assistant Examiner* — Zheng Wei
(74) *Attorney, Agent, or Firm* — Fujitsu Patent Center

(57) ABSTRACT

To provide a program performance analysis apparatus that can present to a user whether tuning made to a program operating on a predetermined hardware is either good or bad, a performance information acquisition unit for obtaining the performance information of a program, a difference information generation unit for generating difference information by making a comparison between the performance information of a first program and that of a second program obtained by making a change to the first program, and a change evaluation unit for evaluating whether the change is either good or bad are comprised.

15 Claims, 12 Drawing Sheets

(56) References Cited

U.S. PATENT DOCUMENTS

| | | | |
|---|---|---|---|
| 6,792,583 B1 * | 9/2004 | Takahashi et al. | 716/119 |
| 7,100,152 B1 * | 8/2006 | Birum et al. | 717/131 |
| 7,171,632 B2 * | 1/2007 | Masuda et al. | 716/102 |
| 7,272,517 B1 * | 9/2007 | Brey et al. | 702/60 |
| 7,315,795 B2 * | 1/2008 | Homma | 702/182 |
| 7,412,509 B2 * | 8/2008 | Murase et al. | 709/224 |
| 7,478,371 B1 * | 1/2009 | Gove | 717/128 |
| 7,506,330 B2 * | 3/2009 | Alexander et al. | 717/157 |
| 7,703,079 B1 * | 4/2010 | Burrows et al. | 717/127 |
| 7,844,953 B2 * | 11/2010 | Morizawa et al. | 717/126 |
| 7,937,690 B2 * | 5/2011 | Casey | 717/128 |
| 8,046,678 B2 * | 10/2011 | Jackson et al. | 715/234 |
| 2003/0208481 A1 * | 11/2003 | Neumann | 707/3 |
| 2004/0054680 A1 * | 3/2004 | Kelley et al. | 707/100 |
| 2004/0193395 A1 * | 9/2004 | Paulraj | 703/22 |
| 2004/0243379 A1 * | 12/2004 | Paulraj | 703/22 |
| 2004/0255282 A1 * | 12/2004 | Eruhimov et al. | 717/151 |
| 2005/0039148 A1 * | 2/2005 | Masuda et al. | 716/1 |
| 2005/0071834 A1 * | 3/2005 | Gates et al. | 717/153 |
| 2005/0183074 A1 * | 8/2005 | Alexander et al. | 717/144 |
| 2005/0223361 A1 * | 10/2005 | Belbute | 717/124 |
| 2005/0283339 A1 * | 12/2005 | Homma | 702/182 |
| 2006/0101418 A1 * | 5/2006 | Barsness et al. | 717/130 |
| 2007/0150893 A1 * | 6/2007 | Grobman | 718/1 |
| 2007/0185990 A1 * | 8/2007 | Ono et al. | 709/224 |
| 2007/0226697 A1 * | 9/2007 | Barsness et al. | 717/127 |
| 2007/0277155 A1 * | 11/2007 | Casey | 717/124 |
| 2008/0127151 A1 * | 5/2008 | Kawahito et al. | 717/159 |
| 2009/0144713 A1 * | 6/2009 | Russell et al. | 717/158 |

FOREIGN PATENT DOCUMENTS

| | | |
|---|---|---|
| JP | 06-250838 A | 9/1994 |
| JP | 6-250877 A | 9/1994 |
| JP | 10-78892 A | 3/1998 |
| JP | 10-275093 A | 10/1998 |
| JP | 11-108702 A | 4/1999 |
| JP | 2002-073369 A | 3/2002 |
| JP | 2003-44275 A | 2/2003 |
| JP | 2005-100161 A | 4/2005 |

* cited by examiner

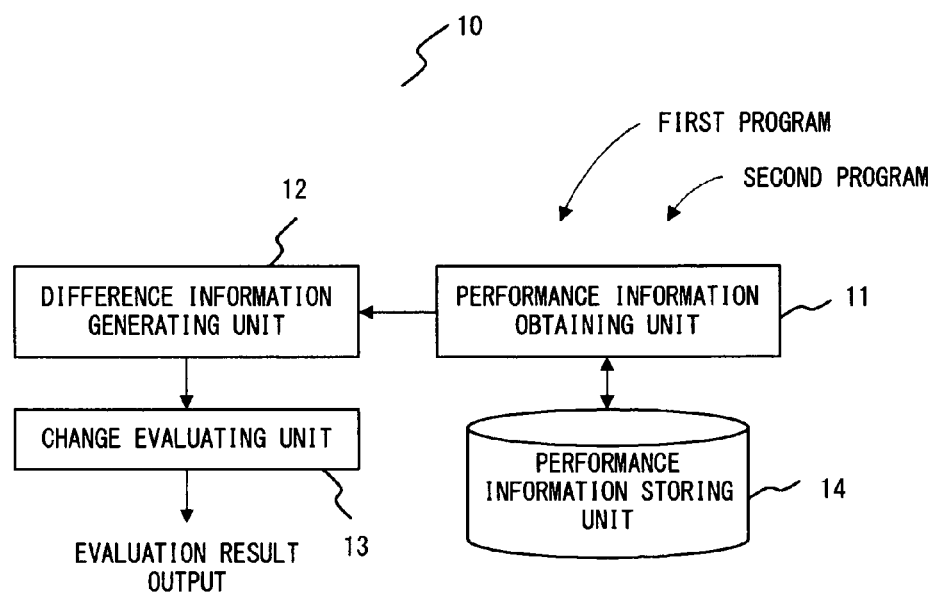
F I G. 1

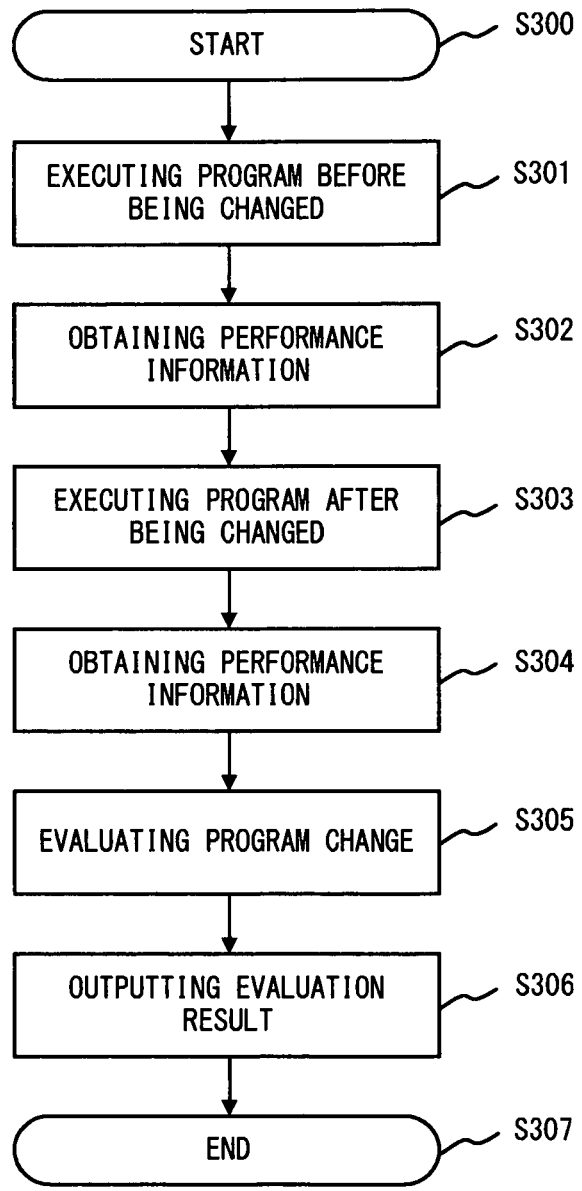
F I G. 3

| COMPARISON ITEM | DETERMINATION METHOD | DETERMINATION REASON |
|---|---|---|
| (1) NUMBER OF VLIWS EXECUTED PER CYCLE | LARGER | INSTRUCTION PARALLELISM IMPROVED |
| (2) AVERAGE NUMBER OF INSTRUCTIONS OF VLIW | LARGER | INSTRUCTION PARALLELISM IMPROVED |
| (3) NUMBER OF STALL CYCLES OF PIPELINE | SMALLER | USE RATIO OF PIPELINE IMPROVED |
| (4) NUMBER OF EXECUTED INSTRUCTIONS | SMALLER | ALGORITHM OF PROGRAM IMPROVED |
| (5) NUMBER OF EXECUTED LOAD/STORE INSTRUCTIONS | SMALLER | ALGORITHM OF PROGRAM IMPROVED |
| (6) DATA CASH MISSING RATE | LOWER | DATA LAYOUT IN MEMORY SPACE IMPROVED ACCESS PATTERN OF DATA IMPROVED |
| (7) INSTRUCTION CACHE MISSING RATE | LOWER | INSTRUCTION CODE LAYOUT IN MEMORY SPACE IMPROVED ACCESS PATTERN OF INSTRUCTION CODE IMPROVED |
| (8) BRANCH PREDICTION ERROR RATE | LOWER | BRANCH PREDICTION DIRECTION OF PROGRAM IMPROVED |

FIG. 5

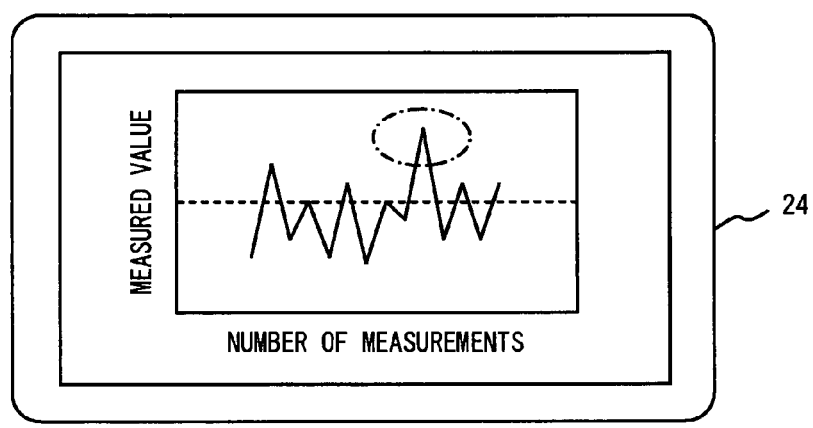
F I G. 7

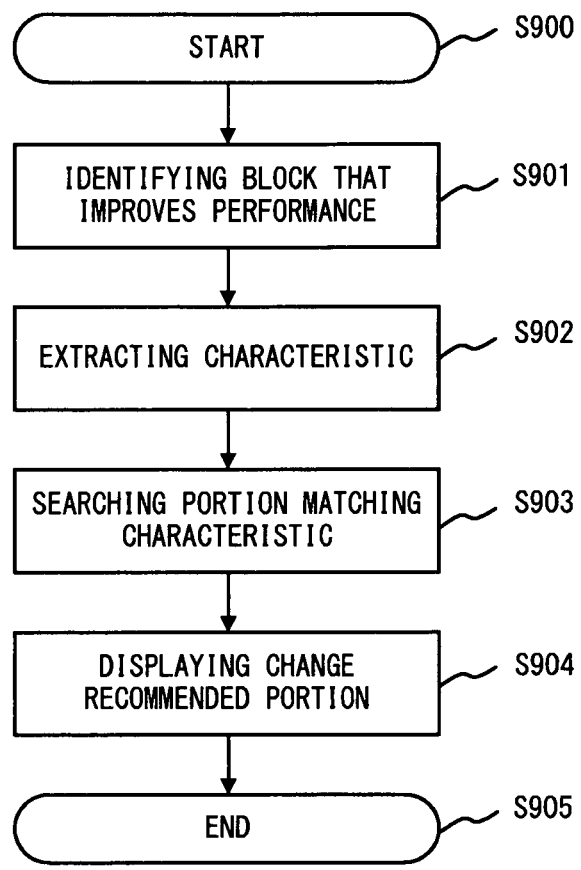
F I G. 9

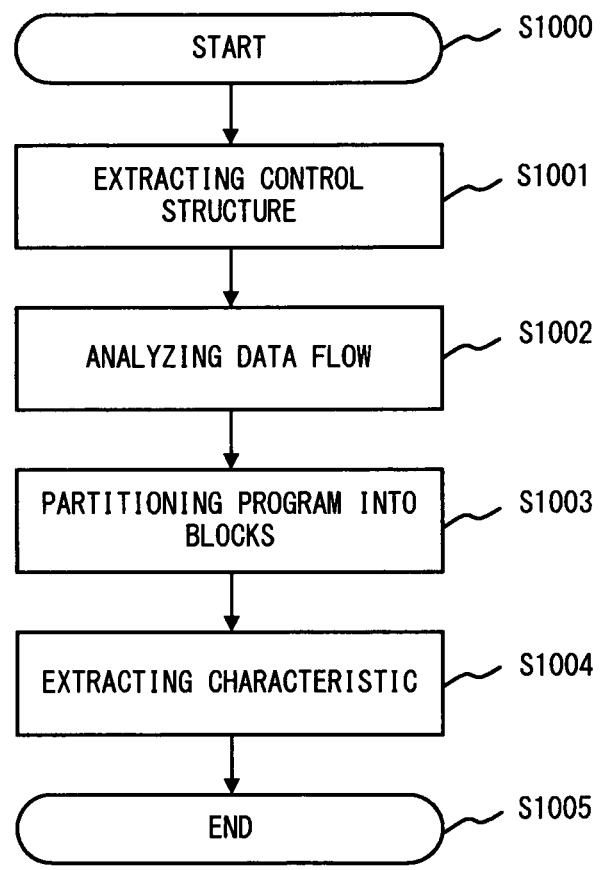
F I G. 1 0

PROGRAM PERFORMANCE ANALYSIS APPARATUS

CROSS-REFERENCE TO RELATED APPLICATION

This application is a continuation application of International Application PCT/JP2006/319367, filed on Sep. 28, 2006 and designated the U.S., the entire contents of which are incorporated herein by reference.

TECHNICAL FIELD

The present invention relates to a program performance analysis apparatus for analyzing the performance of a program when the program is operated on a predetermined hardware.

BACKGROUND ART

When a program is operated on hardware having a predetermined architecture such as an information processing device, a built-in device, etc., the tuning of the program is sometimes made to deliver high performance on the hardware. In addition, diverse systems for assisting the tuning of a program have been proposed in recent years.

Patent Document 1 discloses a programming tuning assisting system for teaching a tuning method that best suits the intention of a user by calculating a correct answer rate, a coverage rate and a hit rate, which represent the degree of understanding, with the use of a knowledge base before and after operations for causing a system to learn the intention of a user, and by displaying such rates on a screen as graphs.

However, to tune a program for its highest possible performance on hardware, means for analyzing whether or not the performance of the program is improved by the tuning is required.

Patent Document 1: Japanese Laid-open Patent Publication No. HEI06-250838

DISCLOSURE OF INVENTION

The present invention was developed in light of the above described situation, and an object thereof is to provide a program performance analysis apparatus that can present whether a change made to a program operating on a predetermined hardware is either good or bad.

To implement the above described object, a program performance analysis apparatus for analyzing the performance of a program operating on a predetermined hardware includes a performance information acquisition unit for obtaining performance information, which indicates the operating state of hardware, from the hardware that executes a program and operates in accordance with instructions of the program, a difference information generation unit for making a comparison between the performance information of a first program, which is obtained by the performance information acquisition unit, and the performance information of a second program obtained by making a change to an arbitrary portion of the first program, and for generating performance difference information from a result of the comparison, and a change evaluation unit for determining whether or not the performance of the program is improved with the change on the basis of the performance difference information generated by the difference information generation unit, and for notifying a user of the determination result.

According to the present invention, performance information that indicates the operating state of each program is obtained by executing on hardware a first program and a second program obtained by making a change to the first program, and performance comparison information is generated from the comparison made between the obtained performance information.

Then, whether or not the performance of the program is improved with the change made to the first program is determined based on the performance comparison information. Accordingly, whether the change made to the program is either good or bad can be presented to a user.

As a result, if a determination result indicating that the program performance is improved with the change is presented, a user can further improve the program performance by making the change to the program. Alternatively, if a determination result indicating that the program performance is not improved with the change is presented, the user can cancel the change, and can improve the program performance by making another new change to the program. This produces the effect of enabling the tuning of the program to be quickly made.

BRIEF DESCRIPTION OF DRAWINGS

FIG. 1 is a schematic diagram depicting the operating principle of a program performance analysis apparatus according to an embodiment of the present invention;

FIG. 3 is a flowchart depicting the outline of a process executed by the program performance analysis apparatus according to the embodiment of the present invention;

FIG. 5 is a schematic diagram depicting a configuration example of evaluation reference information in the embodiment of the present invention;

FIG. 7 is a schematic diagram depicting an example of a statistical display in the embodiment of the present invention;

FIG. 9 is a flowchart depicting a change recommendation portion identification process executed by the program performance analysis apparatus according to the embodiment of the present invention;

FIG. 10 is a flowchart depicting the outline of a process for identifying the characteristic of a program, which is executed by the program performance analysis apparatus according to the embodiment of the present invention;

BEST MODE OF CARRYING OUT THE INVENTION

Figure 2:
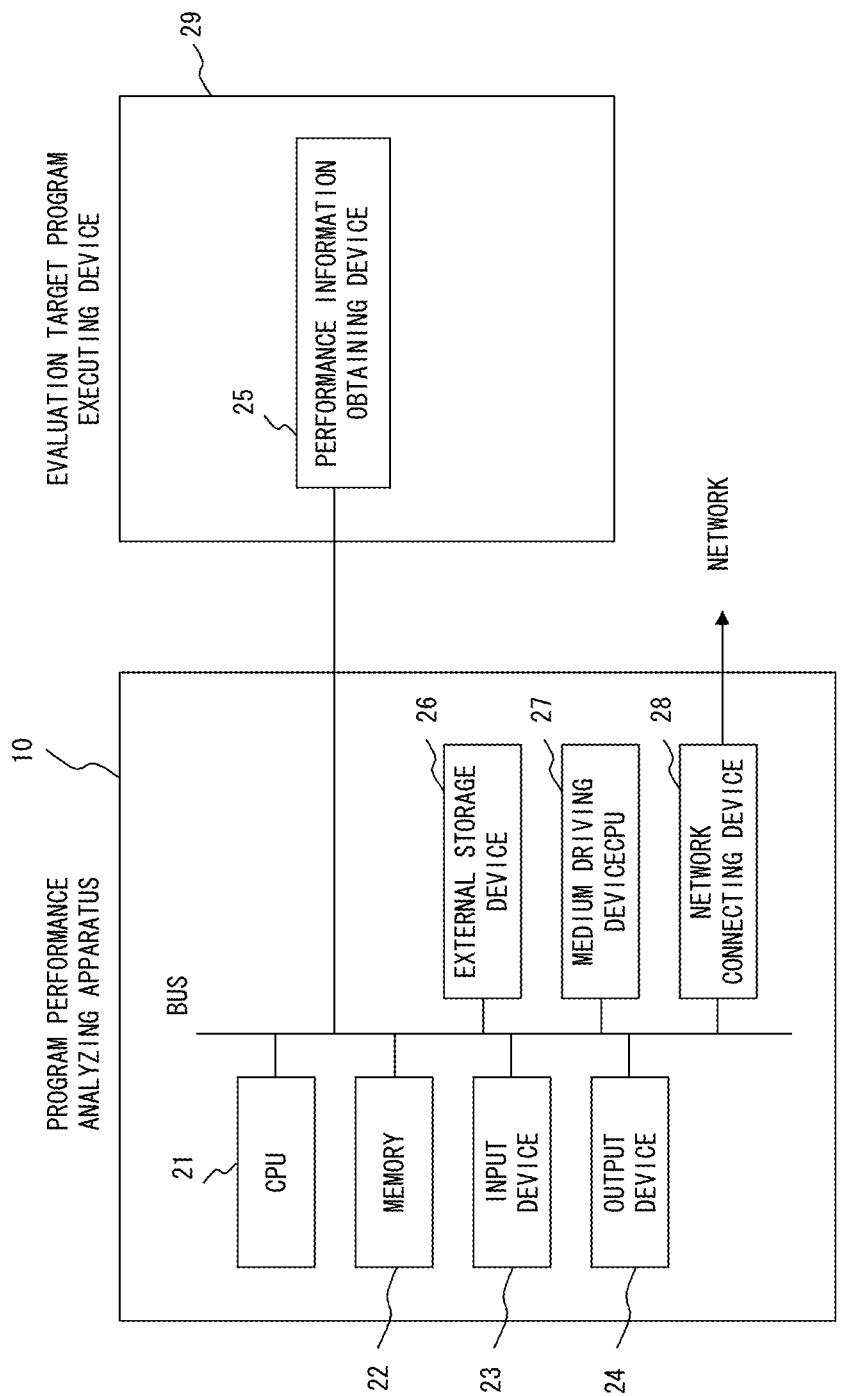
FIG. 2 is a block diagram depicting a configuration example of the program performance analysis apparatus according to the embodiment of the present invention.

Embodiments of the present invention are disclosed below with reference to FIGS. 1 to 12.

FIG. 1 is a schematic diagram depicting the operating principle of a program performance analysis apparatus 10 according to the embodiment of the present invention.

The program performance analysis apparatus 10 depicted in FIG. 1 includes a performance information acquisition unit 11 for obtaining the performance information of a program, a difference information generation unit 12 for generating difference information by making a comparison between the performance information of a first program and that of a second program obtained by making a change to the first program, and a change evaluation unit 13 for evaluating whether the change is either good or bad.

The performance information acquisition unit 11 obtains performance information, which are obtained when the first and the second programs are executed, from hardware that executes the programs, and stores the obtained performance information, for example, in a performance information storing unit 14, etc.

The difference information generation unit 12 generates difference information by making a comparison between performance information obtained by executing the first program and that obtained by executing the second program. This comparison is made for items (hereinafter referred to as comparison items) determined as needed among one or more items that configure the performance information.

The change evaluation unit 13 evaluates whether the change made to the first program is either good or bad based on the difference information between the performance information of the first program and that of the second program. Namely, if the program performance is improved by the change, the change evaluation unit 13 determines that "the change is good". Then, the change evaluation unit 13 outputs the evaluation result to a display unit, etc.

Programs to be analyzed by the program performance analysis apparatus 10 according to this embodiment may be those written in low-level languages such as a machine language, an assembly language, etc. or in high-level languages such as a C language, JAVA (registered trademark), etc. Moreover, the programs may be those written in an interpreter language or a compiler language. Accordingly, the programs may be a program source or an executable format which an information processing device can execute.

Additionally, the hardware indicates, for example, a-CPU (Central Processing Unit) that executes a program, and firmware that controls the CPU. In this embodiment, the hardware includes, for example, a CPU that is virtually implemented on software. Furthermore, the performance information is information indicating the operating state of hardware when a program is executed. The performance information is, for example, information indicating the operation amount of the program, an operating efficiency, a data transfer efficiency, etc.

FIG. 2 is a block diagram depicting a configuration example of the program performance analysis apparatus 10 according to the embodiment of the present invention. The program performance analysis apparatus 10 depicted in FIG. 2 includes a CPU 21 that executes a program for implementing a program performance analysis process according to this embodiment in addition to the execution of peripheral devices and various types of software, a volatile memory 22 (such as a RAM) used to execute the program, an input device 23 (such as a keyboard or a mouse) that is external data input means, an output device 24 for displaying data, etc., a performance information acquisition device 25 for obtaining performance information from a device that executes an evaluation target program (hereinafter referred to as an target program execution & evaluation device 29), an external recording device 26 for recording a program for implementing the program performance analysis process according to this embodiment in addition to a program and data, which are required by the program performance analyzing device 10 to operate, a medium driving device 27 for outputting data in the memory 22 or the external recording device 25 to a portable recording medium (such as a floppy disk, an MO disk, a CD-R, a DVD-R, etc.) or for reading a program, data, etc. from the portable recording medium, and a network connecting device 28 for making a connection to a network. These devices are interconnected by a bus, and can mutually transmit/receive data.

An evaluation board that can obtain information indicating the operating state from the CPU (that executes an evaluation target program) included in the target program execution & evaluation device 29 is used for the performance information acquisition device 25 according to this embodiment. Since various types of evaluation boards are offered, the most suitable one may be used in accordance with the target program execution & evaluation device 29.

The CPU 21 may obtain performance information instead of the performance information acquisition device 25 when the performance information is obtained from hardware by executing an evaluation target program on the hardware that is virtually implemented on software as described with reference to FIG. 1.

In the above described configuration, the performance information acquisition unit 11 is implemented in a way such that the CPU 21 and the performance information acquisition device 25 as needed operate in accordance with a predetermined program instruction. Moreover, the difference information generation unit 12 and the change evaluation unit 13 are implemented in a way such that the CPU 21 operates in accordance with a predetermined program instruction.

FIG. 3 is a flowchart depicting the outline of a process executed by the program performance analysis apparatus 10 according to the embodiment of the present invention.

In step S301, an evaluation target program before being changed (hereinafter referred to as a first program) starts to be executed on the target program execution & evaluation device 29. When the device 29 execute the program, the process goes to step S302.

In step S302, the program performance analysis apparatus 10 obtains performance information (PA (Performance Analyzer) information) from the CPU of the operating target program execution & evaluation device 29 which is running in accordance with a target program instruction.

In this embodiment, (1) the number of VLIWs (Very Long Instruction Words) executed per cycle, (2) an average number of instructions of executed VLIWs, (3) the number of stall cycles of pipeline, (4) the number of executed instructions, (5) the number of executed LOAD/STORE instructions, (6) the number of cache-missing in data cache, (7) the number of cache-missing in instruction cache, (8) the number of a branch prediction error, and the like are obtained from the CPU in the target program execution & evaluation device 29 as performance information. To simplify the entire process, for example, only the number of executed cycles of a valid/invalid process portion may be used as the performance information.

Upon terminating the execution of the first program, the process goes to step S303. Then, the evaluation target program after being changed (hereinafter referred to as a second program) starts to be executed on the target program execution & evaluation device 29 in a similar manner as in step S301. When the device 29 execute the changed target program (second program), the process goes to step S304.

In step S304, the program performance analysis apparatus 10 obtains performance information (PA information) from the CPU related to the operating target program execution & evaluation device 29 which is running in accordance with a program instruction. Upon terminating the execution of the second program, the process goes to step S305.

In step S305, the program performance analysis apparatus 10 generates difference information by making a comparison between the performance information of the first program obtained in step S302 and that of the second program obtained in step S304. Then, the program performance analysis apparatus 10 determines that the program performance is improved with the program change, for example, if the number of VLIWs executed per cycle increases.

In step S306, the program performance analysis apparatus 10 outputs the evaluation result of step S305 to the output device 24, which in turn displays the evaluation result. Then, the process goes to step S307, in which the program performance analysis apparatus 10 terminates the process.

Figure 4:
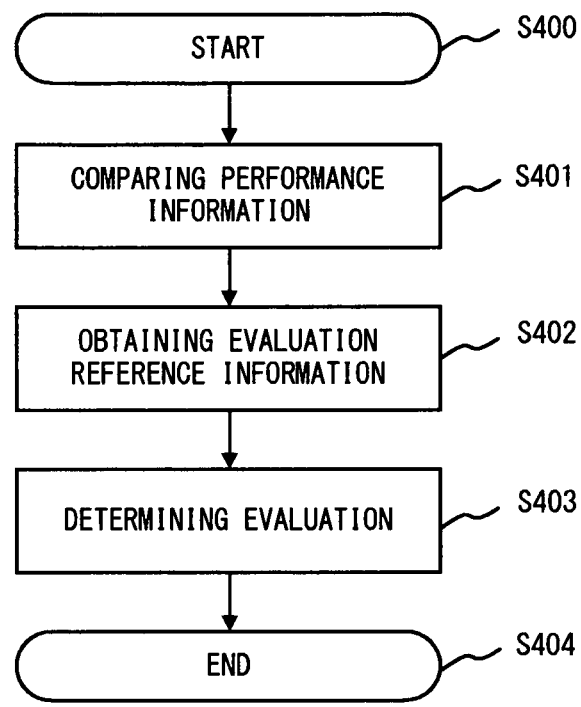
FIG. 4 is a flowchart depicting a specific process of an evaluation made to a program change in the program performance analysis apparatus according to the embodiment of the present invention.

FIG. 4 is a flowchart depicting a specific process of the evaluation (step S305) of the program change depicted in FIG. 3.

After obtaining the performance information of the first and the second programs with the processes in steps S301 to S304 depicted in FIG. 3, the process goes from step S400 to step S401. In step S401, the program performance analysis apparatus 10 generates difference information by making a comparison for each of comparison items that configure the performance information. Upon terminating the comparison process, the process goes to step S402.

Here, the difference information in this embodiment is information about a simple difference in each of the comparison items. For example, the difference information in the comparison item (1) is the value obtained by subtracting (1) the number of VLIWs executed per cycle in the first program from (1) the number of VLIWs executed per cycle in the second program.

In step S402, the program performance analysis apparatus 10 references evaluation reference information 50 loaded, for example, in the memory 22. Then, the program performance analysis apparatus 10 obtains a determination method and a determination reason in each of the comparison items. Then, the process goes to step S403.

A configuration example of the evaluation reference information 50 in the embodiment of the present invention is depicted in FIG. 5. As depicted in FIG. 5, the evaluation reference information 50 in this embodiment is composed of a comparison item, a determination method, and a determination reason.

Comparison items include (1) the number of VLIWs executed per cycle, (2) an average number of instructions of VLIW, (3) the number of stall cycles of pipeline, (4) the number of executed instructions, (5) the number of executed LOAD/STORE instructions, (6) a data cash missing rate, (7) an instruction cash missing rate, and (8) a branch prediction error rate among the performance information obtained in steps S302 and S304 depicted in FIG. 3.

The determination method indicates in which case of the comparison items (1) to (8) the program performance is improved. For example, if (1) the number of VLIWs executed per cycle in the second program is larger than (1) the number of VLIWs executed per cycle in the first program, namely, if the difference information of (1) the number of VLIWs executed per cycle, which is generated in step S401, has a positive value, the program performance is determined to be improved.

Similarly, if (3) the number of stall cycles of pipeline in the second program is smaller than (3) the number of stall cycles of pipeline in the first program, namely, if the difference information of (3) the number of stall cycles of pipeline, which is generated in step S401, has a negative value, the program performance is determined to be improved.

The determination reason indicates the reason why each of the comparison items (1) to (8) is improved. For example, the reason why (1) the number of VLIWs executed per cycle increases is that instruction parallelism is improved with a program change.

In step S403, the program performance analysis apparatus 10 extracts an item (hereinafter referred to as a performance improved item) the program performance of which is improved from among the comparison items. For example, if the number of performance improved items is one half or more of the total number of the comparison items, the program performance is determined to be improved as a whole. Alternatively, the sum of performance improved items may be calculated after assigning a weight to each of scored comparison items, and the program performance may be determined to be improved if the sum becomes equal to or higher than a predetermined score.

After determining the evaluation, the process goes to step S404, in which the program performance analysis apparatus 10 terminates the evaluation process. Thereafter, the process goes to step S306 depicted in step S306, in which the program performance analysis apparatus 10 causes the output device 24 to display the evaluation result.

Figure 6:
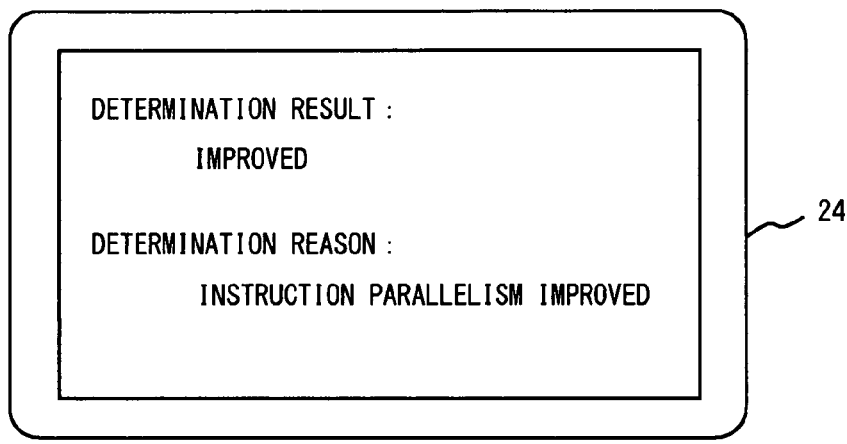
FIG. 6 is a schematic diagram depicting a display example of a determination result in the embodiment of the present invention.

FIG. 6 is a schematic diagram depicting a display example of a determination result in the embodiment of the present invention.

This figure depicts the display example in the case where a determination result and a determination reason are displayed on the output device 24. The result determined in step S403 of FIG. 4 is displayed as the determination result. Moreover, the determination reason of the item that is most improved among the performance improved items is obtained from the evaluation reference information 50 and displayed as the determination reason. A plurality of determination reasons may be displayed for each of the comparison items as needed.

Furthermore, the program performance analysis apparatus 10 according to this embodiment may store obtained performance information (or a change ratio of each item of performance information) and a program modification as a database each time the apparatus 10 executes the program performance analysis processes depicted in FIGS. 3 and 4, and may statistically display the performance information in accordance with a user instruction or as occasion demands FIG. 7 is a schematic diagram depicting an example of a statistical display in the embodiment of the present invention. The horizontal and the vertical axes of the statistical display depicted in this figure indicate the number of analysis and a measured value respectively. The number of analysis indicates the number of times that performance information is obtained with the program performance analysis processes depicted in FIGS. 3 and 4.

Here, in the statistical display in this embodiment, the program performance analysis apparatus 10 detects and highlights a portion where a measured value remarkably changes. FIG. 7 depicts the case where the detected portion is enclosed with a dotted-dashed line as highlight. However, the highlight is not limited to this one. The detected portion may be highlighted depending on need. For example, the detected portion may be displayed in different color.

Furthermore, in the statistical display in this embodiment, for example, statistical information such as an average value, a variance, etc. may be displayed in addition to the display of a measured value resulting from each analysis as depicted in FIG. 7.

In the above provided description, also the case where a plurality of changes are made to the same program is expected to occur. For example, the case where changes A, B and C are made to the same program is expected to occur. In this case, for example, after obtaining the performance information by executing the programs as depicted in FIG. 3, a comparison target selection screen depicted in FIG. 8 may be displayed to cause a user to select comparison targets, for which the processes in steps S305 and S306 are to be executed.

Figure 8:
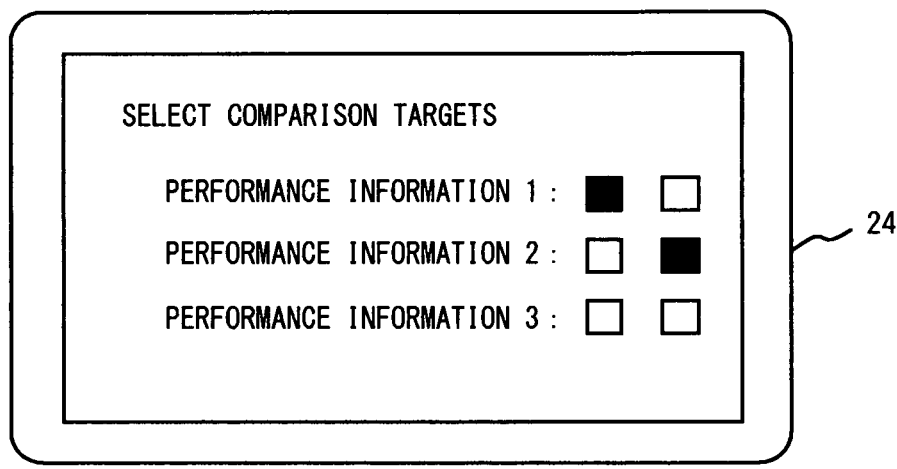
FIG. 8 is a schematic diagram depicting a display example of a comparison target selection screen in the embodiment of the present invention.

FIG. 8 is a schematic diagram depicting a display example of the comparison target selection screen in the embodiment of the present invention. The comparison target selection screen depicted in FIG. 8 represents the case where performance information (performance information 1 to 3 depicted in this figure) about three programs, which are acquired by making three different changes to the same program with the processes in steps S303 and S304 depicted in FIG. 3, are obtained.

When a user clicks a square □ with the input device 23 (such as a mouse, etc.), the program performance analysis apparatus 10 obtains the clicked performance information to recognize it as a comparison target. Then, the program performance analysis apparatus 10 fills the square of the corresponding performance information (□ is selected to ■). FIG. 8 depicts the case where the performance information 1 and 2 are selected.

The above described program performance analysis apparatus 10 according to this embodiment also executes a process for identifying a change recommendation portion for a program, which is described below, as needed after terminating the process depicted in FIG. 3.

FIG. 9 is a flowchart depicting the change recommendation portion identification process executed by the program performance analysis apparatus 10 according to the embodiment of the present invention.

In step S901, the program performance analysis apparatus 10 identifies a block that improves program performance with a program change in the first program. For example, the program performance analysis apparatus 10 identifies a process portion that improves the program performance by referencing difference information. Then, the program performance analysis apparatus 10 identifies the block including the instruction of the corresponding process.

In step S902, the program performance analysis apparatus 10 extracts the characteristic of the block identified in step S901. A method for extracting the characteristic of a block will be described later with reference to FIG. 10. Upon terminating the extraction of the characteristic, the process goes to step S903.

In step S903, the program performance analysis apparatus 10 extracts the characteristic of each block in the entire second program. Then, the program performance analysis apparatus 10 searches a block having the same characteristic as that extracted in step S902.

Then, the program performance analysis apparatus 10 causes the output device 24 to display the block searched in step S903 as a change recommendation portion that is expected to improve the program performance with the program change in step S904, and terminates the process in step S905. Here, the block indicates, for example, a group of instructions for executing one or more operations. For example, a nested structure including a series of instructions in a portion provided by a FOR statement, or a nested structure including a series of instructions in a portion provided by an IF statement may be recognized as one block.

FIG. 10 is a flowchart depicting the outline of the process for identifying the characteristic of a program, which is executed by the program performance analysis apparatus 10 according to the embodiment of the present invention.

In step S1001, the program performance analysis apparatus 10 extracts a control structure (such as the nest structure of an IF statement, a FOR statement, etc.) from a program for each block. Then, the process goes to step S1002.

In step S1002, after analyzing the dependency of data for each block, the program performance analysis apparatus 10 analyzes a data flow of the data. Here, the data flow is, for example, a flow of a series of processes for predetermined data. The data flow is, for example, information indicating that data a is read from a storage destination A, processed into data b in a process B, and stored in a storage destination C.

In step S1003, the program performance analysis apparatus 10 partitions the program into blocks. Then, the process goes to step S1004.

In step S1004, the program performance analysis apparatus 10 reads from the external storage device 26 characteristic information that prestores, for example, a plurality of characteristic patterns of a control structure and a data flow. Then, the program performance analysis apparatus 10 makes a comparison between the characteristic pattern and the control structure extracted in step S1001 and the data flow analyzed in step S1002 for each block. If they match, the program performance analysis apparatus 10 determines that the block has the characteristic pattern.

Upon terminating the extraction of the characteristic, the process goes to step S1005, in which the program performance analysis apparatus 10 terminates the process.

The above described program performance analysis apparatus 10 according to the embodiment of the present invention may further include a program development environment and a program execution debugging environment, which are intended for a program change.

Figure 11:
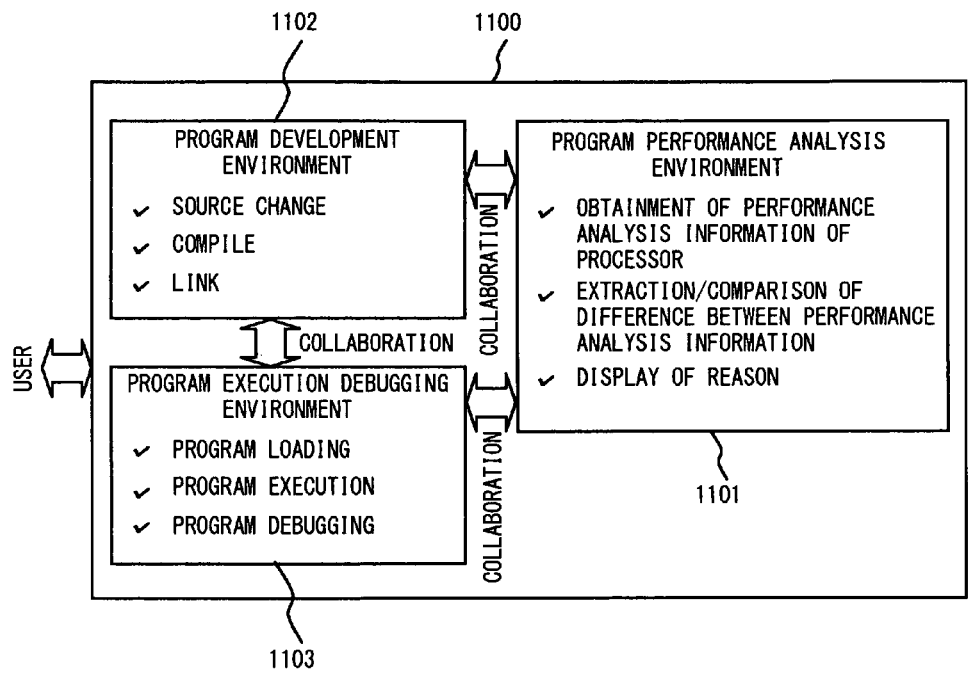
FIG. 11 is a schematic diagram depicting an example of the program performance analysis apparatus having a program performance analysis environment, a program development environment, and a debugging environment.

FIG. 11 is a schematic diagram depicting an example of the program performance analysis apparatus 1100 including a program performance analysis environment 1101, a program development environment 1102, and a debugging environment 1103.

In the program performance analysis environment 1101, the program performance analysis processes depicted in FIGS. 3 and 4 are executed. Namely, performance information are obtained when programs are executed, difference information is generated from the obtained performance information, and whether a change made to the program is either good or bad is evaluated based on the difference information. Then, the output device 24 is caused to display the evaluation result along with its reason.

In the program development environment 1102, for example, a change is made to a program source, which is then compiled to generate an object file, etc., and object files required for execution are linked to generate data in an executable format (executable file).

In the debugging environment 1103, the executable file generated in the program development environment 1102 is loaded into the memory and executed, and debugging means for making debugging is provided.

The program performance analysis environment 1101, the program development environment 1102, and the debugging environment 1103 are working together, whereby a user can smoothly perform a series of operations.

Figure 12:
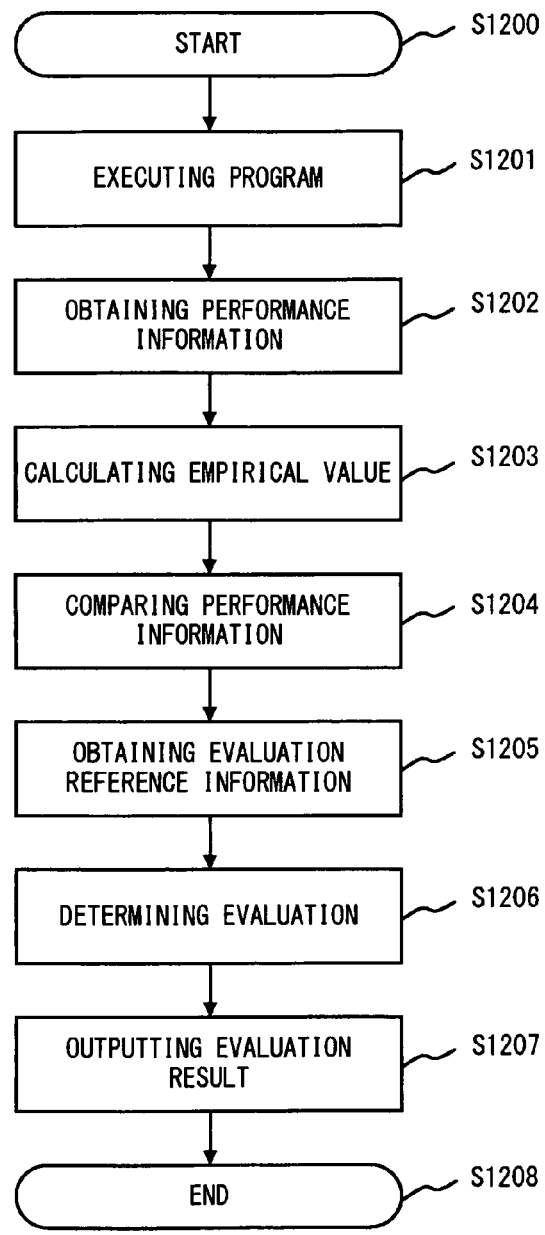
FIG. 12 is a flowchart depicting a modification example of the process executed by the program performance analysis apparatus according to the embodiment of the present invention.

FIG. 12 is a flowchart depicting a modification example of the process executed by the program performance analysis apparatus 10 according to the embodiment of the present invention.

In step S1201, an evaluation target program starts to be executed on the target program execution & evaluation device 29. When the program starts to be executed, the process goes to step S1202.

In step S1202, the program performance analysis apparatus 10 obtains performance information from the CPU related to the operating target program execution & evaluation device 29 which is running in accordance with a program instruction. The performance information described with reference to FIG. 3 is used here.

Upon terminating the execution of the program, the process goes to step S1203, in which the program performance analysis apparatus 10 calculates an empirical value from performance information (hereinafter referred to as previous performance information) that is previously obtained and stored in the external storage device 26, etc.

As the empirical value, any of (a) an average value, (b) the maximum value, (c) the minimum value, and (d) the overall evaluation value of the previous performance information is used for each of the comparison items depending on need.

Here, assuming that the value of performance information (of a comparison item) measured at the nth time is Mn, and a weight coefficient assigned to Mn is Cn, (a) the average value can be obtained with the following equation (1).

$$C1 \times M1 + C2 \times M2 + C3 \times M3 + \ldots + Cn \times Mn \quad (1)$$

where Cn=1/n.

(b) the maximum value can be obtained with the following equation (2).

$$MAX(C1 \times M1, C2 \times M2, C3 \times M3, \ldots, Cn \times Mn) \quad (2)$$

where Cn=1.

(c) the minimum value can be obtained with the following equation (3).

$$MIN(C1 \times M1, C2 \times M2, C3 \times M3, \ldots, Cn \times Mn) \quad (3)$$

where Cn=1.

MAX(A, B, . . . ) indicates a function to calculate the maximum value among A, B, . . . , whereas MIN(A, B, . . . ) indicates a function to calculate the minimum value among A, B. . . .

(d) the overall evaluation value can be obtained with the following equation (4) if the degree of importance is assumed to be D1, D2, D3, . . . , Dn.

$$D1 \times M1 + D2 \times M2 + D3 \times M3 + \ldots + Dn \times Mn \quad (4)$$

Here, the degree of importance is the magnitude of weight assigned to the performance information M1 to Mn. For example, the degree of importance of the performance information Mx when the program performance is improved among the performance information M1 to Mn is recognized to be high, and the weight coefficient Dx (its initial value is 1) assigned to the performance information Mx is set to, for example, 1.5 times. Alternatively, the degree of importance of the performance information Mx having a high ratio of a difference from the previously measured performance information (for example, the difference between M1 and M2) may be recognized to be high, and the weight coefficient Dx (its initial value is 1) assigned to the performance information Mx may be set to, for example, 1.5 times.

Upon terminating the above described empirical value calculation, the process goes to step S1204, in which the program performance analysis apparatus 10 generates difference information by making a comparison between the performance information obtained in step S1202 and the empirical value calculated in step S1203. The difference information in this embodiment is information, for example, about a simple difference in each comparison item within the evaluation reference information 50.

After generating the difference information, the process goes to step S1205, in which the program performance analysis apparatus 10 references the evaluation reference information 50, for example, loaded in the memory 22, and obtains a determination method and a determination reason in each of the comparison items.

Furthermore, in step S1206, the program performance analysis apparatus 10 extracts a performance improvement item from the difference information generated in step S1204 for each of the comparison items. Then, the program performance analysis apparatus 10 determines that the program performance is improved as a whole, for example, if the number of performance improvement items is equal to or larger than one half of the total number.

After determining the evaluation, the process goes to step S1207, in which the program performance analysis apparatus 10 causes the output device 24 to display the evaluation result, and terminates the process.

As described above, the program performance analysis apparatus according to this embodiment can easily evaluate program performance by obtaining and comparing the performance information of a plurality of programs such as the first and the second programs (steps S401 and S1204) in order to cope with difficulty in the evaluation of program performance by using single performance information.

Additionally, the program performance analysis apparatus according to this embodiment determines whether or not the program performance of the second program, which is generated by making a change to the first program, is improved with the change (steps S305 and S1206), and presents to a user the determination result (whether the change is either good or bad) (steps S306 and S1207).

If the determination result indicating that the program performance is improved with the change is presented, the user may make further tuning. Alternatively, if the determination result indicating that the program performance is deteriorated with the change is presented, the user cancels the change, and can make another tuning again. Accordingly, the tuning of the program can be quickly made.

Furthermore, a determination reason is presented for a determination result (FIG. 6), whereby a user can recognize the effect of a change made to a program.

Still further, a change recommendation portion is presented (step S904), whereby a user can make to a program a change that is effective at improving program performance, and can make the tuning of the program more quickly. Still further, program performance is determined by using empirical values (steps S1203 to S1206), whereby higher tuning effect can be produced with an increase in the number of times of tuning.

The invention claimed is:

1. A program performance analysis apparatus for analyzing performance of a program being executed on hardware, the program performance analysis apparatus comprising:
a performance information acquisition unit to obtain, from a CPU (Central Processing Unit) that executes the program, performance information indicating the operating state of the CPU and a plurality of items including a number of Very Long Instruction Words (VLIWs) per cycle, an average number of instructions of VLIWs, a number of stall cycles of pipeline, a number of executed instructions, a number of executed LOAD/STORE instructions, a number of cache-missing in data cache, a number of cache-missing in instruction cache, and a number of a branch prediction error;

a difference information generator to make a comparison between the plurality of items of performance information of a first program, which is obtained by the performance information acquisition unit, and the plurality of items of performance information of a second program obtained by making a change to an arbitrary portion of the first program, and to generate performance difference information from a result of the comparison; and a change evaluation unit to determine whether the performance of the program is improved with the change using the performance difference information generated by the difference information generator, and to output a determination result, wherein the change evaluation unit determines that the performance of the program is improved when one half or more of the plurality of items are improved.

2. The program performance analysis apparatus according to claim 1, wherein:

the change evaluation unit reads from a storing unit evaluation reference information including a determination method for determining whether the performance of the program is improved using the performance difference information, and a determination reason, determines whether the performance of the program is improved in accordance with the determination method, and causes a display unit to display the determination reason along with a determination result.

3. The program performance analysis apparatus according to claim 1, further comprising:

a statistical displaying unit to store obtained performance information in a storing unit each time the performance information acquisition unit obtains the performance information, to statistically display the performance information on a display unit, and to highlight a portion exhibiting a remarkable change.

4. The program performance analysis apparatus according to claim 1, further comprising:

an empirical value generating unit to store obtained performance information each time the performance information acquisition unit obtains the performance information, and to generate an empirical value by statistically processing the performance information, wherein the difference information generator makes a comparison between the empirical value and the performance information of the second program, and generates performance difference information from a result of the comparison.

5. The program performance analysis apparatus according to claim 1, further comprising:

a performance improved portion identifying unit to identify an improved portion that improves program performance with the change in the first program;

a characteristic extracting unit to extract a characteristic of the program in the improved portion; and a change recommendation portion identifying unit to identify a change recommendation portion expected to improve the program performance by searching a portion having a same characteristic as the extracted characteristic in the second program.

6. A program performance analyzing method for analyzing performance of a program operating on hardware, the program performance analyzing method comprising:

obtaining, from a CPU (Central Processing Unit) that executes the program, performance information indicating the operating state of the CPU and a plurality of items including a number of Very Long Instruction Words (VLIWs) per cycle, an average number of instructions of VLIWs, a number of stall cycles of pipeline, a number of executed instructions, a number of executed LOAD/STORE instructions, a number of cache-missing in data cache, a number of cache-missing in instruction cache, and a number of a branch prediction error;

storing the obtained performance information in a performance information storing unit;

reading from the performance information storing unit performance information of a first program, and performance information of a second program obtained by making a change to an arbitrary portion of the first program;

making a comparison between the plurality of items of the performance information of the first and the second programs;

generating performance difference information from a result of the comparison;

storing the performance difference information in a performance difference information storing unit and determining whether the performance of the program is improved with the change using the performance difference information read from the performance difference information storing unit; and outputting the determination result, wherein the determining determines that the performance of the program is improved when one half or more of the plurality of items are improved.

7. The program performance analyzing method according to claim 6, wherein:

evaluation reference information including a determination method for determining whether the performance of the program is improved using the performance difference information, and a determination reason is read from a storing unit, whether the performance of the program is improved is determined in accordance with the determination method, and a display unit is caused to display the determination reason along with a determination result.

8. The program performance analyzing method according to claim 6, further comprising:

storing obtained performance information in the performance information storing unit each time the performance information is obtained, statistically displaying the stored performance information on a display unit, and highlighting a portion exhibiting a remarkable change.

9. The program performance analyzing method according to claim 6, further comprising:

storing obtained performance information in the performance information storing unit each time the performance information is obtained, and generating an empirical value by statistically processing the stored performance information, wherein a comparison between the empirical value and the performance information of the second program is made, and performance difference information is generated from a result of the comparison.

10. The program performance analyzing method according to claim 6, further comprising:
   identifying an improved portion that improves program performance with the change in the first program;
   extracting a characteristic of the program in the improved portion; and
   identifying a change recommendation portion expected to improve the program performance by searching a portion having a same characteristic as the extracted characteristic in the second program.

11. A non-transitory computer-readable medium storing a program that causes a processor to execute a control of an information processing device to execute a procedure, the procedure comprising:
   obtaining, from a CPU (Central Processing Unit) that executes the program, performance information indicating the operating state of the CPU and a plurality of items including a number of Very Long Instruction Words (VLIWs) per cycle, an average number of instructions of VLIWs, a number of stall cycles of pipeline, a number of executed instructions, a number of executed LOAD/STORE instructions, a number of cache-missing in data cache, a number of cache-missing in instruction cache, and a number of a branch prediction error;
   storing the obtained performance information in a performance information storing unit;
   reading performance information of a first program, which is obtained, and performance information of a second program obtained by making a change to an arbitrary portion of the first program, making a comparison between the plurality of items of the performance information of the first and the second programs, generating performance difference information from a result of the comparison, and storing the performance difference information in a performance difference information storing unit; and
   determining whether the performance of the program is improved with the change using the performance difference information read from the performance difference information storing unit, and outputting the determination result, wherein
   the determining determines that the performance of the program is improved when one half or more of the plurality of items are improved.

12. The non-transitory computer-readable medium according to claim 11, wherein
   evaluation reference information including a determination method for determining whether the performance of the program is improved using the performance difference information, and a determination reason is read from a storing unit, whether the performance of the program is improved is determined in accordance with the determination method, and a display unit is caused to display the determination reason along with a determination result.

13. The non-transitory computer-readable medium according to claim 11, the procedure further comprising:
   storing obtained performance information in the performance information storing unit each time the performance information is obtained, statistically displaying the stored performance information on a display unit, and highlighting a portion exhibiting a remarkable change.

14. The non-transitory computer-readable medium according to claim 11, the procedure further comprising:
   storing obtained performance information in the performance information storing unit each time the performance information is obtained, and generating an empirical value by statistically processing the stored performance information, wherein
   a comparison between the empirical value and the performance information of the second program is made, and performance difference information is generated from a result of the comparison.

15. The non-transitory computer-readable medium according to claim 11, the procedure further comprising:
   identifying an improved portion that improves program performance with the change in the first program;
   extracting a characteristic of the program in the improved portion; and
   identifying a change recommendation portion expected to improve the program performance by searching a portion having a same characteristic as the extracted characteristic in the second program.

\* \* \* \* \*